United States Patent [19]

Scharlemann

[11] Patent Number: 4,727,551
[45] Date of Patent: Feb. 23, 1988

[54] WIGGLER PLANE FOCUSING IN A LINEAR FREE ELECTRON LASER

[75] Inventor: Ernst T. Scharlemann, Livermore, Calif.

[73] Assignee: The United States of America as represented by the United States Department of Energy, Washington, D.C.

[21] Appl. No.: 800,630

[22] Filed: Nov. 21, 1985

[51] Int. Cl.$^4$ .................................................. H01S 3/00
[52] U.S. Cl. ............................................ 372/2; 372/37
[58] Field of Search .................................. 372/2, 37, 4

[56] References Cited

U.S. PATENT DOCUMENTS

| | | | |
|---|---|---|---|
| 3,822,410 | 7/1974 | Madey | 372/2 |
| 4,283,687 | 8/1981 | Madey et al. | 372/2 |
| 4,425,649 | 1/1984 | Elias et al. | 372/2 |
| 4,449,219 | 5/1984 | Smith et al. | 372/2 |
| 4,461,004 | 7/1984 | Madey | 372/2 |
| 4,500,843 | 2/1985 | Szoke et al. | 330/4.3 |
| 4,510,455 | 4/1985 | Prosnitz et al. | 330/4.3 |

OTHER PUBLICATIONS

H. Motz; "Applications of the Radiation from Fast Electron Beams"; May 1951, pp. 527-535; Journal of Applied Physics vol. 22, No. 5.

Primary Examiner—James W. Davie
Assistant Examiner—Bertha Randolph
Attorney, Agent, or Firm—John F. Schipper; Clifton E. Clouse, Jr.; Judson R. Hightower

[57] ABSTRACT

Free electron laser apparatus that provides a magnetic centering force to turn or focus a non-axial electron toward the longitudinal axis as desired. The focusing effect is provided by wiggler magnet pole faces that are approximately parabolically shaped.

4 Claims, 5 Drawing Figures

WIGGLER PLANE FOCUSING IN A LINEAR FREE ELECTRON LASER

The U.S. Government has rights in this invention pursuant to Contract No. W-7405-ENG-48 between the U.S. Department of Energy and the University of California, for the operation of Lawrence Livermore National Laboratory.

FIELD OF THE INVENTION

This invention relates to free electron lasers and techniques for electron beam focusing in such systems.

BACKGROUND OF THE INVENTION

In a free electron laser with a long, linear wiggler magnet, the external focusing required to keep the electron beam particles from transversely dispersing can seriously degrade laser performance. The transverse focusing modulates the longitudinal velocity of each beam electron, periodically and non-adiabatically changing the phase of each electron with respect to the electromagnetic wave. Phase changes of order unity over a betatron period can strongly detrap or debunch electrons and greatly reduce the gain of a linear wiggler amplifier.

Relevant background work on free electron lasers (FELs), beginning with the initial work of H. Motz, Journal of Applied Physics, 22 527(1950), and continuing through approximately 1981, is discussed in some detail in U.S. Pat. No. 4,500,843, issued to A. Szoke and D. Prosnitz and assigned to the assignee hereof; and this discussion is incorporated herein by reference.

Approximately 32 U.S. Patents directed to FELs have issued since 1971; most of these have issued since 1980. Only one of these patents, U.S. Pat. No. 4,283,687 issued to Elias, Madey and Smith for a FEL with end-tapered wiggler magnet strength, contemplates the use of a helical periodic magnet. The use of such a magnet allows the associated magnetic field to decrease monotonically to zero as one approaches the exit of the magnet region. Helical magnets are quite difficult to construct, and Elias et al do not discuss any alternative designs that would allow transverse focusing that approximates the focusing available with a helical magnet.

SUMMARY OF THE INVENTION

It is an object of this invention to provide time-independent means for focusing an electron beam in a magnetic wiggler plane.

It is another object of the invention to provide curved magnet pole faces for control of electron trajectories in the associated magnetic field.

Other objects of the invention, novel features and advantages thereof will become clear by reference to the detailed specification and the accompanying drawings.

To achieve the foregoing objects, the invention in one embodiment may comprise: a linear wiggler magnet system, that produces a vector magnetic field B on the wiggler region of substantially $$\underline{B} = \frac{B_o}{k_y} [\hat{U}_x k_x \sinh(k_x x) \sinh(k_y y) \cos(k_w z) +$$

$$\hat{U}_y k_y \cosh(k_x x) \cosh(k_y y) \cos(k_w z) -$$

-continued
$$\hat{U}_z k_w \cosh(k_x x) \sinh(k_y y) \sin(k_w z)],$$

where $$\lambda_w = \frac{2\pi}{k_w} = \frac{2\pi}{[k_x^2 + k_y^2]^{\frac{1}{2}}}$$

is the desired wiggler magnet period in the longitudinal direction of the free electron laser; a source of relativistic electrons of substantially equal kinetic energy, positioned to introduce a relativistic electron beam into the wiggler magnet region so that the electrons propagate parallel to the longitudinal axis of the wiggler magnet; and a source of substantially monochromatic electromagnetic radiation of a predetermined wavelength, positioned to introduce a radiation beam into the wiggler magnet region in timed relationship with introduction of a relativistic electron beam therein by the relativistic electron source, so that the em. radiation beam propagates substantially parallel to the relativistic electron beam within the wiggler magnet region.

BRIEF DESCRIPTION OF THE DRAWINGS

The accompanying drawings, which are incorporated in and form part of the specification, illustrate two embodiments of the invention and, together with the detailed description, serve to explain the principles of the invention.

DETAILED DESCRIPTION OF THE PREFERRED EMBODIMENT

Figure 1:
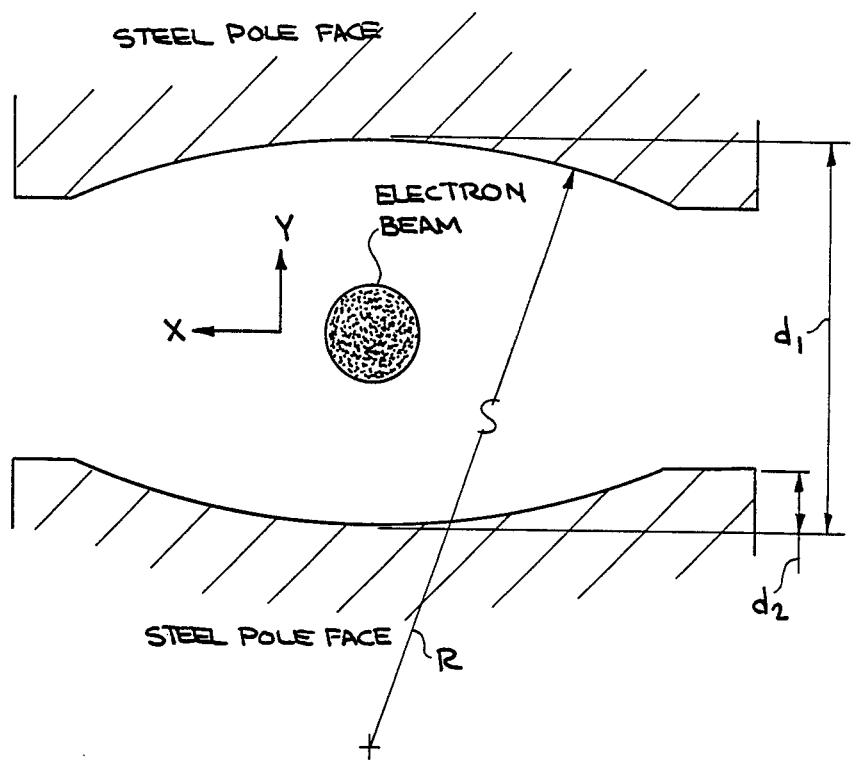
FIG. 1 is a schematic view of the magnetic pole faces according to the invention.

The gain of a free electron laser (FEL) depends critically on maintaining a precise phase relationship between the wiggle motion of the electrons and the electric field of the co-propagating light wave. The electrons in a focused electron beam undergo transverse oscillations (betatron oscillations) in the focusing field. The oscillating transverse velocity can produce an oscillating longitudinal velocity, and thereby affect the gain. In a long wiggler some focusing is required; all electron beams have a non-zero spread in the angle at which individual electrons propagate (i.e., a non-zero emittance), and the electrons will eventually disperse in the absence of focusing.

Helical wiggler focusing in the x- and y-directions is provided by the wiggler itself. The wiggler magnetic field necessarily increases away from the axis of the field; the spatial variation of the magnetic field focuses the electron beam. In a linear wiggler of conventional design, focusing is provided by the wiggler in only one of the transverse directions, the direction of the wiggler magnetic field; external focusing, usually provided by adding a quadrupole component to the field, is required in the other transverse direction (the wiggler plane).

The natural focusing of the wiggler has the well-known but curious property that the longitudinal velocity of an electron, averaged over a wiggler period, is not modulated by the betatron oscillations of the electron. Natural wiggler focusing therefore does not affect the phase of an electron's wiggle motion with respect to the optical electric field. The only effect on the gain of the FEL occurs because of the intrinsic spread of transverse velocities in the beam, and the only cure for this spread is to find a better quality beam. Quadrupole focusing (and most other forms of external focusing) introduces an additional problem; the longitudinal velocity, averaged over a wiggler period, is not constant throughout the betatron orbit of an electron. The phase between electron wiggle motion and electric field of the light wave is periodically modulated by the betatron motion. In a high-gain, constant-wiggler-field amplifier, where the gain is accompanied by physical bunching of the electron beam, the phase modulation can disperse the bunches and reduce the gain. In a tapered wiggler amplifier, where the gain is produced by the controlled, coherent deceleration of electrons trapped in ponderomotive potential wells, the periodic phase modulation can detrap or debunch a significant fraction of the electrons. The end result is that the difference in performance between a conventional linear wiggler with quadrupole focusing and the equivalent helical wiggler, for the same electron beam parameters, is much greater than would be expected from only the Bessel function field-particle coupling factor.

Helical wigglers are, unfortunately, more difficult to build than linear wigglers; a helical wiggler with an adjustable taper would be particularly difficult to build. Furthermore, the linearly polarized light from a linear wiggler is very much easier to handle, at high output powers, than the helically polarized light from a helical wiggler.

Figure 5:
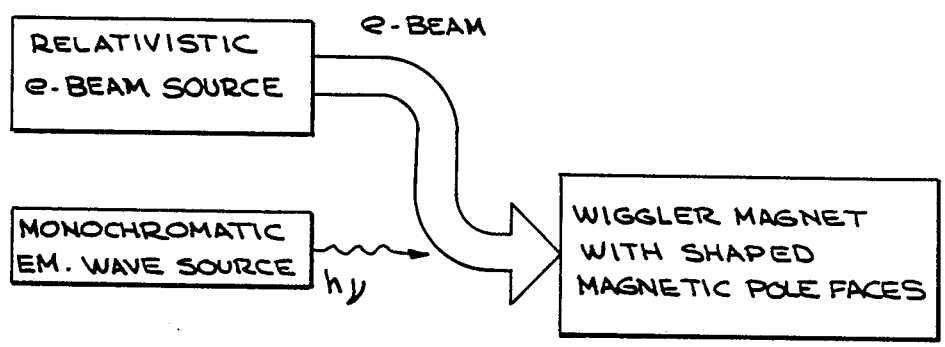
FIG. 5 is a schematic view of the invention.

By a slight modification of the magnetic pole design of a linear wiggler, shown schematically in FIG. 5, the wiggler focusing and resonance properties may be made substantially the same as those of a helical wiggler, but with none of the technical difficulties of a helical wiggler. The modification involves reshaping the magnet pole faces with an approximate parabolic curvature in a direction transverse to the (longitudinal) beam propagation direction. Parabolic focusing focuses the beam and preserves the FEL resonance.

In the conventional linear FEL with planar pole pieces and the Cartesian coordinate system indicated in FIG. 1, the wiggler vector magnetic field is $$\underline{B} = \frac{mc^2}{e} b_o [\hat{U}_y \cosh k_w y \cos k_w z - \hat{U}_z \sinh k_w y \sin k_w z], \quad (1)$$

$b_o$ = constant (cm$^{-1}$)

which is derived from a scalar potential $$\chi = -\frac{mc^2}{e} \frac{b_o}{k_w} \sinh k_w y \cos k_w z. \quad (2)$$

Ignoring the perturbing presence of the electric field of the co-propagating light wave and the electromagnetic force on a free electron arising from the combined Coulomb potential of all other free electrons present, the equations of the motion of a particular free electron in the wiggler field are $$\ddot{x}_e = \frac{c}{\nu} [b_y \dot{z}_e - b_z \dot{y}_e] \quad \dot{x}_e = \frac{dx_e}{dt}, \quad (3)$$

$$\ddot{y}_e = \frac{c}{\nu} [b_z \dot{x}_e - b_x \dot{z}_e], \quad \dot{y}_e = \frac{dy_e}{dt},$$

$$\ddot{z}_e = \frac{c}{\nu} [b_x \dot{y}_e - b_y \dot{x}_e], \quad \dot{z}_e = \frac{dz_e}{dt},$$

$$\underline{b} = \frac{e}{mc^2} \underline{B} = \hat{U}_x b_x + \hat{U}_y b_y + \hat{U}_z b_z,$$

with $b_x = 0$ here.

With the choice of B shown in Equation (1), and the approximations $$\frac{dx_e}{dt} \simeq \frac{dz}{dt} \frac{dx_e}{dz} = v_z \frac{dx_e}{dz}, \quad (4)$$

$$\frac{d^2 x_e}{dt^2} \simeq \frac{d^2 z}{dt^2} \frac{dx_e}{dz} + \left(\frac{dz}{dt}\right)^2 \frac{d^2 x_e}{dz^2} \simeq \quad (5)$$

$$V_z^2 \frac{d^2 x_e}{dz^2} \simeq \frac{c}{\nu} v_z \left[ b_y - b_z \frac{dy_e}{dz} \right],$$

$$\frac{dy_e}{dt} \simeq \frac{dy_e}{dz}, \quad (6)$$

$$\frac{d^2 y_e}{dt^2} \simeq v_z^2 \frac{d^2 y_e}{dz^2} \simeq \frac{c}{\nu} v_z \left[ b_z \frac{dx_e}{dz} - b_x \right], \quad (7)$$

Hereafter, the bracket pair $< >_w$ will denote an average over a wiggler period $\Delta z = 2\pi/k_w$, viz.

$$<f(z)>_w = \frac{k_w}{2\pi} \int_0^{2\pi/k_w} f(z) dz \quad (8)$$

One then finds from Equations (1) and (3) that $$<\ddot{y}_e>_w \simeq -\frac{b_o c^2}{2\nu} \sinh k_w y. \quad (9)$$

This indicates that the force in the y-direction, averaged over a wiggler spatial period ($\Delta z = 2\pi/k_w$) is always directed toward $y = 0$. No such result is available for the average force in the x-direction with the magnetic field shown in Equation (1).

Assume instead one introduces a magnetic field in which the magnetic force magnitude $|b_y|$ increases with $|x|$ as well as with $|y|$. Although it is not obvious initially, this can provide some average focusing (over a wiggler period) in the x-direction and in the y-direction. One such choice is $$\chi = \frac{mc^2}{ek_y} b_o \cosh k_x x \sinh k_y y \cos k_w z, \quad (10)$$

$$\underline{B} = \frac{mc^2}{ek_y} b_o [\hat{U}_x k_x \sinh k_x x \sinh k_y y \cos k_w z +$$

$$\hat{U}_y k_y \cosh k_x x \cosh k_y y \cos k_w z -$$

-continued
$$\hat{U}_z k_w \cosh k_x x \sinh k_y y \sin k_w z],$$

$b_o$=constant,
$k_w^2 = k_x^2 + k_y^2$.

For ease of reference, write $\beta_e = V_e/c = \beta_{e\parallel} + \beta_{e\perp}$, where $\beta_{e\parallel}$ and $\beta_{e\perp}$ denote the normalized electron velocity in the z-direction and in the xy-plane, respectively. For the electron beams considered here, $$\beta_{e\perp}^2 \approx 1 - \beta_{e\parallel}^2 \ll 1, \tag{11}$$

$$\nu = (1 - \beta_e^2)^{-\frac{1}{2}} = (1 - \beta_{e\parallel}^2 - \beta_{e\perp}^2)^{-\frac{1}{2}} \gg 1,$$

$$\beta_{e\parallel} = \left(1 - \frac{1}{\nu^2} - \beta_{e\perp}^2\right)^{\frac{1}{2}} \approx 1 - \frac{1}{2\nu^2} - \tfrac{1}{2}\beta_{e\perp}^2.$$

Interest now centers on the average over the (longitudinal) wiggler period of the normalized longitudinal velocity of the electron, $<\beta_{e\parallel}>_w$. Ideally, this velocity should remain constant in the electron's betatron orbit, which has the period $\lambda_\beta = 2\pi/k_\beta = mc^2/eB \gg \lambda_w = 2\pi/k_w$. From Equation (11), one notes that this is approximately equivalent to requiring the constancy over a betatron orbit of $<\beta_{e\perp}^2>_w$.

Assume the position $r_e$ of a representative free electron may be written as $$r_e = r_{eo} + r_{e1}, \tag{12}$$

where $\dot{r}_{e1} = (\dot{x}_{e1}, \dot{y}_{e1}, \dot{z}_{e1})$ varies rapidly over the wiggler wavelength $\lambda_w$ and $\dot{r}_{eo} = (\dot{x}_{eo}, \dot{y}_{eo}, \dot{z}_{eo})$ is substantially constant over a wiggler wavelength but does vary over a betatron wavelength $\lambda_\beta$. An approximate physical interpretation is that $r_{eo}$ is the guiding center position of the electron and $r_{e1}$ is the perturbation introduced by the wiggler magnet. One now assumes that $b_o$ is sufficiently small and $\nu$ is sufficiently large that $$\left|\frac{b_o}{\nu k_w}\right| \ll |k_w x|, |k_w y| \ll 1,$$

Adopting the choice of B shown in Equation (8) and using Equations (4)–(7) and the approximations $$\cosh k_x x = 1 + k_x^2 x^2/2, \tag{13}$$

$$\sinh k_x x = k_x x,$$

$$\cosh k_y y = 1 + k_y^2 y^2/2,$$

$$\sinh k_y y = k_y y.$$

From the arguments set forth in Scharlemann, Jour. of Appl. Physics 58 2154(1985), one verifies that $$<m\ddot{x}>_w = \tag{14}$$

$$-\frac{mc^2 b_o^2}{2\nu^2 k_w^2}\left[k_x^2 x_{e0}(1-(k_w^2+k_y^2)y_{e0}^2)\frac{\dot{x}_{e0}\dot{y}_{e1}}{c^2}k_w^2 y_{e0}\right],$$

$$<m\ddot{y}>_w = \tag{15}$$

-continued
$$-\frac{mc^2 b_o^2}{2\nu^2 k_w^2}\left[k_y^2 y_{e0} + \left(\frac{\dot{x}_{e0}}{c}\right)^2 k_w^2 y_{e0} + k_x^4 x_{e0}^2 y_{e0}\right]$$

The dominant (first-appearing) terms in each of Equations (14) and (15) are proportional to $-x_e$ and $-y_e$, respectively, indicating that this configuration will focus the electron beam toward the (longitudinal) z-axis, as desired.

Turning to the evaluation of $<\beta_{e\parallel}>_w$, one further verifies that $$<\beta_{e\perp}^2>_w = \frac{1}{c^2}[<\dot{x}_e^2>_w + <\dot{y}_e^2>_w] = \frac{b_o^2}{\nu^2 k_w^2}[1 + \tag{16}$$

$$k_x^2 x_e^2 + k_y^2 y_e^2],$$

$$<\beta_{e\parallel}>_w = 1 - \frac{1}{2\nu^2} - \tfrac{1}{2}<\beta_{e\perp}^2>_w \tag{17}$$

so that $<\beta_{e\perp}^2>_w$ and $<\beta_{e\parallel}>_{HD\,w}$ are both substantially constant over a betatron period, as desired.

The magnetic field B(r) given in Equation (10) may be obtained approximately by shaping the magnet pole faces appropriately and assuming that, for the magnet material used (e.g., cobalt/steel) the magnetic permeability $\mu \approx \infty$. At, say, the initial point of each wiggler magnet period ($\cos k_w z = 1$) the pole faces should follow a curve of constant potential $\chi$:

$$\cosh k_x x \sinh k_y y = C_o \text{ (constant)}, \tag{18a}$$

(or)

$$Y(x) = \frac{1}{k_y}\sinh^{-1}(C_o \text{sech } k_x x) = \tag{18b}$$

$$\frac{1}{k_y}\sinh^{-1}(C_o) - \frac{C_o}{2[1+C_o^2]^{\frac{1}{2}}}(k_x x)^2 + O(k_x^4 x^4).$$

This form for pole face shape is approximately parabolic and is illustrated in FIG. 1 for $k_x = k_y = k_w/\sqrt{2}$.

The magnetic material from which the wiggler magnet pole pieces are fabricated may be steel or vanadium permendur (50 percent Co, 2 percent Va, and 48 percent steel or iron) or similar magnetic materials. Ordinary steel has a magnetic flux saturation point of substantially 16,000 Gauss. For some applications, materials such as vanadium permendur, with a higher magnetic flux saturation point of substantially 20,000 Gauss, may be preferred. With reference to FIG. 1, in one design of the pole pieces it has been found that a pole face approximate radius "R" of 1–1.5 cm. with pole face maximum separation $d_1 \leq 3$ cm and pole face curvature depth $d_2 \approx 0.25$ cm are suitable choices of the geometric design parameters.

An LLNL two-dimensional numerical simulation code, FRED, has been modified to generate and compare the laser power, trapped fraction of electron beam particles and other variables of interest for three situations: (a) a helical wiggler; (b) a linear wiggler with parabolic pole face shaping as discussed above; and (c) a linear wiggler with sufficient quadrupole focusing to keep the e-beam shape circular. In its current version, the code tracks the phase space trajectories (in $\nu$ and $\psi$) of as many as N=4,000 electrons within one ponderomotive potential well as the particles move longitudinally (z-direction), averaged over a wiggler period, viz.

$$\frac{dv_i}{dz} = -e_s \frac{a_w f_B}{v_i} \sin\psi_i \quad (i = 1, 2, \ldots N,) \quad (19)$$

$$\frac{d\theta_i}{dz} = k_w - \frac{k_L}{2v_i^2}[1 + a_w^2 + v_i^2\beta_{e\perp,\beta}^2 - 2a_w f_B a_s^2 \cos\psi_i + a_s^2], \quad (20)$$

$$a_w = \frac{b_o}{\sqrt{2}\, k_w},$$

$$e_s = \frac{eE_L}{\sqrt{2}\, mc^2},$$

$$f_B = J_o(q) - J_1(q) \text{(linear wiggler)}$$
$$= 1 \text{ (helical wiggler)},$$

$$q = \frac{a_w^2}{2(1 + a_w^2)},$$

$$a_s = e_s/k_L,$$

$E_L$ and $k_L$ are laser electric field strength and wave number, $\beta_{e,\beta}^2$ is betatron motion contribution to $\beta_e^2$, and $\theta_i$ is the phase of electron i with respect to a plane electromagnetic wave propagating with phase velocity equal to c ($\theta_i = \psi_i - \phi$).

The equations for transverse motion of the electrons are of the form $$\frac{d^2 x_i}{dz^2} = -k_{\beta x}(z,v)^2 x_i,$$

$$\frac{d^2 y_i}{dz^2} = -k_{\beta y}(z,v)^2 y_i,$$

where $k_{\beta x}$ and $k_{\beta y}$ depend upon the specific focusing method used. For a linear wiggler with parabolic pole face shaping analyzed above, $$k_{\beta x} = \frac{b_o k_x}{\sqrt{2}\, v k_w},$$

$$k_{\beta y} = \frac{b_o k_y}{\sqrt{2}\, v k_w},$$

For quadrupole focusing in a linear wiggler, $$k_{\beta x} = k_z = \left(\frac{eQ_o}{mc^2}\right)^{\frac{1}{2}},$$

$$k_{\beta y} = \left[\left(\frac{b_o}{\sqrt{2}\, v}\right)^2 - k_z^2\right]^{\frac{1}{2}},$$

For a helical wiggler, $$k_{\beta x} = k_{\beta y} = \frac{b_o}{\sqrt{2}\, v}.$$

For the code simulation, the laser field is assumed to be cylindrically symmetric and to vary with the coordinates $r = [x^2 + y^2]^{\frac{1}{2}}$ and z. The laser field variables are determined using the paraxial approximation. The code FRED uses a finite element approach to obtain a numerical solution of the combined laser field variable equations and Equations (20) and (21). Three sets of simulations have been made, differing only in the type of wiggler magnet assumed, as indicated above. The apparatus is a 25-M length wiggler magnet driven by a 50 MeV induction linac, tapered in $a_w$ ($\alpha\lambda_w$) according to a self-design procedure discussed in Kroll, Morton and Rosenbluth, I.E.E.E. Jour. of Quantum Electronics QE-17 1496 (1981), and Fawley, Prosnitz and Scharlemann, Phys. Rev. 30A 2472 (1984). A representative or "design" electron in a circular orbit of radius $r = r_{design}$ is maintained at fixed (resonant) phase angle $\psi = \psi_R = 0.35$ by varying $a_w$ as the electron is decelerated. In all three situations, the em. wave or beam to be amplified has a beam waist that occurs $\Delta z = 0.5$ Rayleigh ranges before the beam enters the wiggler magnet so that the beam is divergent beyond that point. The FEL appears to perform better with a diverging em. beam than for a converging em-beam.

Figure 2:
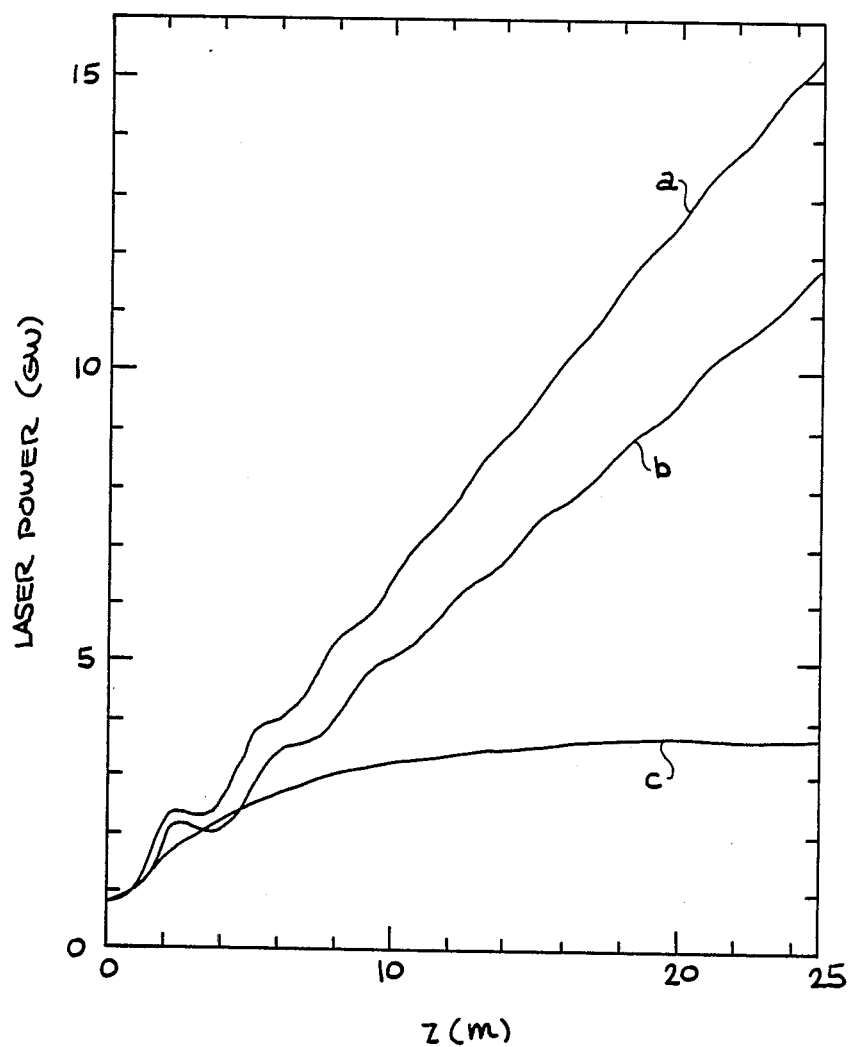
FIG. 2 is a graphic presentation of FEL laser power developed versus longitudinal distance traveled (z) for a 25-M length, tapered wiggler magnet for (a) a helical magnet, (b) a linear wiggler with parabolic pole face shaping and (c) a linear wiggler with quadrupole focusing, using a numerical simulation code.

FIG. 2 exhibits the computed laser power as a function of the longitudinal coordinate z within the wiggler magnet for $k_x = k_y = k_w\sqrt{2}$. The laser power, $L_q$, for quadrupole focusing saturates quickly and is less than $\frac{1}{3}$ of the laser power, $L_h$, for a helical wiggler magnet for $z \geq 17M$. However, the laser power, $L_p$, for a linear wiggler with parabolic pole face shape continues to increase with increasing z (as does $L_h$) and $L_p \geq 0.75 L_h$. Thus, using a linear wiggler magnet with parabolic pole face shapes, one can obtain most of the performance available from a helical wiggler magnet without the concomitant complexities of helical magnet construction.

Figure 3:
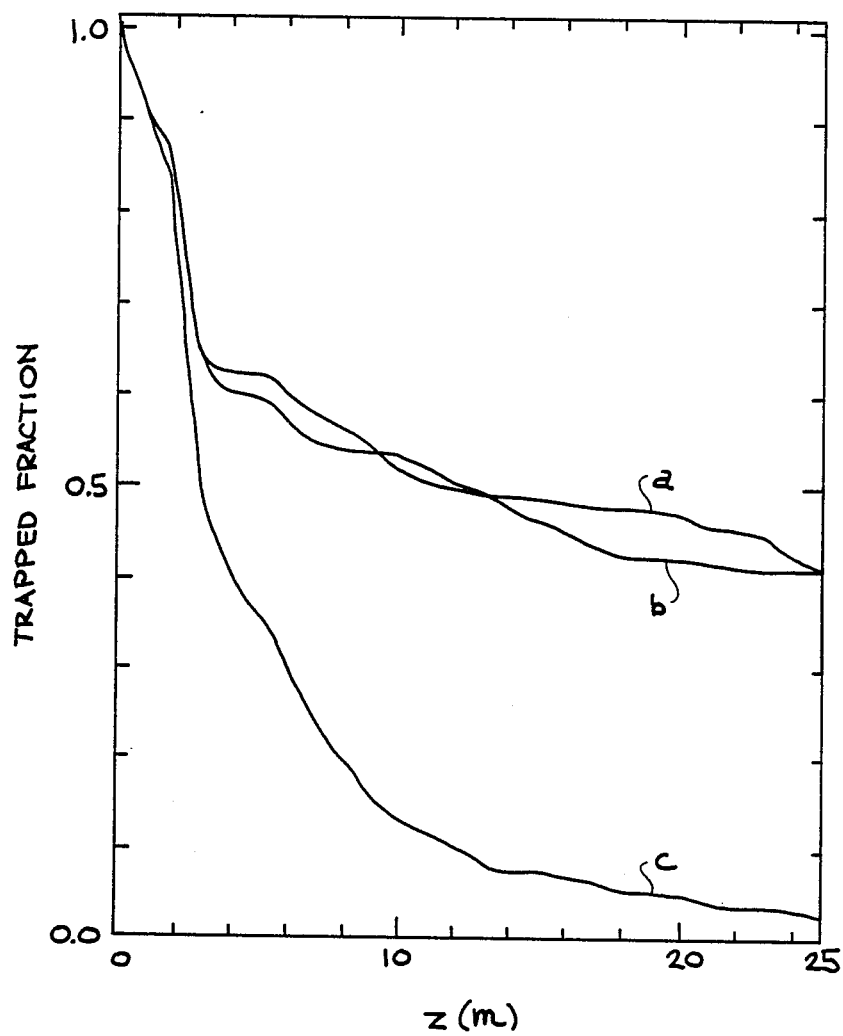
FIG. 3 is a graphical representation of the fraction of beam electrons trapped in the potential well versus longitudinal distance traveled (z) for the three configurations of FIG. 2.

One reason for the poor performance of a linear wiggler magnet with quadrupole focusing is indicated in FIG. 3: the trapped electron fraction (satisfying $-\pi < \psi < \pi$) for this case plunges to nearly zero for $z \gtrsim 10M$, whereas the trapped electron fraction for the other two situations decreases toward zero at a more moderate rate for $z \gtrsim 3M$. Again, the "parabolic" wiggler magnet performs nearly as well as the "helical" wiggler magnet.

Figure 4:
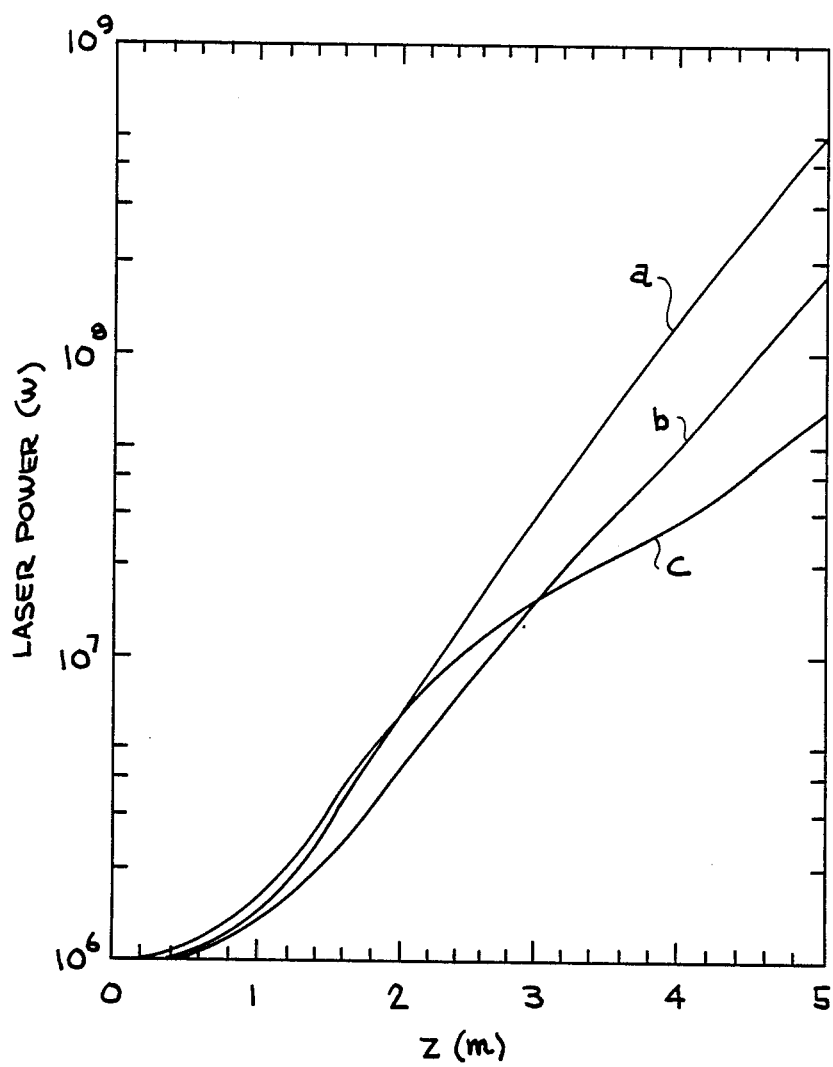
FIG. 4 is a graphical representation of FEL laser power developed versus longitudinal distance traveled (z) for a 5-M length, tapered wiggler magnet for the three wiggler magnet configurations of FIG. 2.

In a second set of simulations, the wiggler magnet length (5M) is shorter, the induction linac delivers 50 MeV as before, the laser input power is $P_{in} = 1$ MW and the wiggler magnet is not tapered. The em. beam waist occurs at the entrance to the wiggler magnet, and the beam is still divergent therein. FIG. 4 exhibits laser power as a function of z. The plot is semi-logarithmic, to permit comparison of exponential gain. The associated gains are 6.7 dB/M (helical), 5.4 dB/M, ("parabolic") and 3 dB/M ("quadrupole," beyond $z \approx 3M$). Again, the "quadrupole" wiggler magnet performs poorly vis-a-vis the other two apparati because of strong electron detrapping for $z \gtrsim 3M$.

The foregoing description of preferred embodiments of the invention is presented for purposes of illustration only and is not intended to limit the invention to the precise form disclosed; modification and variation may be made without departing from what is regarded as the scope of the invention.

I claim:

1. Free electron laser apparatus for improved beam focusing performance, the apparatus comprising:
   magnetic field means for producing a transverse periodic wiggler magnetic field of alternating polarity with predetermined spatial period $\lambda_w$ along a portion of a perdetermined z-axis, the magnetic field means producing a vector magnetic field B (x,y,z) adjacent to the z-axis that varies with the Cartesian coordinates x, y, z of position adjacent to the z-axis substantially as $$\underline{B} = (B_0/k_y)[\hat{u}_x k_x \sinh(k_x x)\sinh(k_y y)\cos(k_w z) +$$

$$\hat{u}_y k_y \cosh(k_x x)\cosh(k_y y)\cos(k_w z) -$$

$$\hat{u}_z k_w \cosh(k_x x)\sinh(k_y y)\sin(k_w z)],$$

where $k_x$ and $k_y$ are predetermined positive numbers, $k_w^2 = k_x^2 + k_y^2$, $\lambda_w = \pi/k_2$ is the predetermined wiggler magnet period, $B_0$ is a reference magnetic field strength, and $\hat{u}_x$, $\hat{u}_y$ and $\hat{u}_z$ are vectors of unit length parallel to the Cartesian x-axis, y-axis, and z-axis, respectively;

electron beam means for producing a beam of relativistic electrons of predetermined energy, positioned to direct this electron beam substantially along the z-axis through the region where the magnetic field means is located; and electromagnetic radiation means for producing a beam of substantially monochromatic electromagnetic radiation of a predetermined wavelength in timed relationship with production of an electron beam by the electron beam means, positioned to direct this radiation beam substantially along the z-axis through the region where the magnetic field means is located.

2. Apparatus according to claim 1, wherein said wiggler magnetic field means includes wiggler magnet material drawn from the class consisting of steel and vanadium permendur.

3. Free electron laser apparatus for improved beam focusing performance, the apparatus comprising:

magnetic field means for producing a transverse periodic wiggler magnetic field of alternating polarity with predetermined spatial period $\lambda_w$ along a portion of a predetermined z-axis, the magnetic field means producing a vector magnetic field $\hat{B} = \hat{u}_x B_x + \hat{u}_y B_y + \hat{u}_z B_z$, where $\hat{u}_x$, $\hat{u}_y$ and $\hat{u}_z$ are unit length vectors parallel to the Cartesian x-axis, y-axis and z-axis, respectively, and where $B_x$, $B_y$ and $B_z$ are magnetic field components whose dependences upon the spatial coordinate z satisfy $B_x \propto \cos k_w z,$ $B_y \propto \cos k_w z,$ $B_z \propto \sin k_w z,$ with $k_w = 2\pi/\lambda_w$;

with the magnetic field means having magnet pole faces that are oriented substantially facing along the y-axis and that have a transverse cross section in the xy-plane given substantially by a shape function $y(x) = \sinh^{-1}(C_0 \sec hk_x x)/k_y,$ where $C_0$, $k_x$ and $k_y$ are predetermined dpositive constants satisfying the relation $k_x^2 + k_y^2 = k_w^2$;

electron beam means for producing a beam of relativistic electrons of predetermined energy, positioned to direct this electron beam substantially along the z-axis through the region where the magnetic field means is located; and electromagnetic radiation means for producing a beam of substantially monochromatic electromagnetic radiation of a predetermined wavelength in timed relationship with production of an electron beam by the electron beam means, positoned to direct this radiation beam substantially along the z-axis through the region where the magnetic field means is located.

4. Apparatus according to claim 3, wherein said magnetic field means includes wiggler magnet material drawn from the class consisting of steel and vanadium permendur.

* * * * *